United States Patent [19]

Lee

[11] Patent Number: 4,976,853
[45] Date of Patent: Dec. 11, 1990

[54] CONTROL VALVE MEANS FOR USE IN A FILTRATION APPARATUS FOR TREATING WASTE PRODUCT

[76] Inventor: Chung Y. Lee, 375-21, Daebang-Dong, Dongjak-Ku, Seoul, Rep. of Korea

[21] Appl. No.: 305,436

[22] Filed: Feb. 2, 1989

[51] Int. Cl.⁵ .......................................... B01D 33/06
[52] U.S. Cl. .................................. 210/107; 210/179; 210/374; 210/391; 210/403
[58] Field of Search .................... 210/97, 98, 108, 178, 210/179, 185, 241, 374, 393, 394, 403, 411, 383

[56] References Cited

U.S. PATENT DOCUMENTS

| | | | |
|---|---|---|---|
| 1,594,999 | 8/1926 | Carter | 210/393 |
| 2,177,560 | 10/1939 | Coogan et al. | 210/383 |
| 2,649,688 | 8/1953 | Slomer | 210/97 |
| 3,017,029 | 1/1962 | Berninger | 210/108 |
| 4,295,963 | 10/1981 | Drori | 210/108 |
| 4,368,125 | 1/1983 | Murray | 210/374 |
| 4,381,236 | 4/1983 | Cox | 210/374 |
| 4,615,801 | 10/1986 | Lee | 210/185 |
| 4,755,291 | 7/1988 | Lee | 210/179 |
| 4,804,419 | 2/1989 | Schaper et al. | 210/374 |

Primary Examiner—Frank Spear
Assistant Examiner—Joseph Drodge
Attorney, Agent, or Firm—Birch, Stewart, Kolasch & Birch

[57] ABSTRACT

An improved control valve for use in a filtration apparatus for treating waste product which comprises a tapered rotary cylinder, a rotary filtration cylinder disposed around the tapered rotary cylinder, a fixed steam injection pipe disposed above the rotary filtration cylinder, and a plurality of control valve members whereby the waste product which is conveyed inside the rotary filtration cylinder and is heated, and which collects in the holes of the rotary filtration cylinder is cleaned away by the spraying of the surface of the rotary filtration cylinder with hot steam through nozzles of a fixed injection pipe under the control of the pressure in a treatment zone between the tapered rotary cylinder and the rotary filtration cylinder.

10 Claims, 3 Drawing Sheets

FIG. I

CONTROL VALVE MEANS FOR USE IN A FILTRATION APPARATUS FOR TREATING WASTE PRODUCT

BACKGROUND OF THE INVENTION

1. Field of the Invention

The present invention relates to an improved filtration and washing apparatus which includes a tapered rotary cylinder and a rotary filtration cylinder disposed around the tapered rotary cylinder. More particularly, the present invention relates to an improved filtration and washing apparatus having a control valve means which is actuated for controlling the pressure in a treatment zone between a tapered rotary cylinder and a rotary filtration cylinder.

2. Prior Art of the Invention

Many types of apparatus for filtrating and washing waste product are known in the art. It is common practice in the prior art to use vacuum filter apparatuses, centrifugal separators, or roller presses, etc. However, since the dehydrated filth contains a high degree of water, there arises the problems of fuel expense for drying and burning up the filth as well as the transportation charges.

According to the U.S. Pat. Nos. 4,615,801 entitled "rotary filtration means in the filth condensation-dehydration apparatus" and 4,755,291 entitled "filtration and washing apparatus with adjustable rotary filtration cylinder" owned by the inventor of the present invention, filtration apparatuses are disclosed which include a control valve associated with an outlet thereof. However, since the control valve is operated by hand, it is very difficult to accurately control the pressure in the treatment zone. Furthermore, since the control valve is moved by fastening or loosening a pair of bolts, the disc-type control valve cannot uniformly fasten or loosen an outlet aperture disposed in the rear end of the treatment zone.

SUMMARY OF THE INVENTION

Accordingly, it is an object of the present invention to provide an improved filtration and washing apparatus.

Another object of the present invention is to provide a filtration and washing apparatus which is constructed for heating waste product in a rotary filtration cylinder by spraying the surface of the rotary filtration cylinder with hot steam through a plurality of nozzles of a fixed steam injection pipe whereby the efficiency of the overall filtration and waste treatment process of the apparatus are substantially improved.

Still another object of the present invention is provide an improved control valve means for use in a filtration apparatus for treating waste product, which includes a control valve for closing and opening an outlet so that the pressure in a treatment zone between a tapered rotary cylinder and a rotary filtration cylinder can be easily and readily controlled.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an improved control valve use in a filtration apparatus for treating waste product which comprises a tapered rotary cylinder, a rotary filtration cylinder disposed around the tapered rotary cylinder, a fixed steam injection pipe disposed above the rotary filtration cylinder, and a control valve means whereby the waste product which is conveyed inside the rotary filtration cylinder and is heated, and which collects in the holes of the rotary filtration cylinder is cleaned away by the spraying of the surface of the rotary filtration cylinder with hot steam through nozzles of a fixed injection pipe under pressure in a treatment zone between the tapered rotary cylinder and the rotary filtration cylinder.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
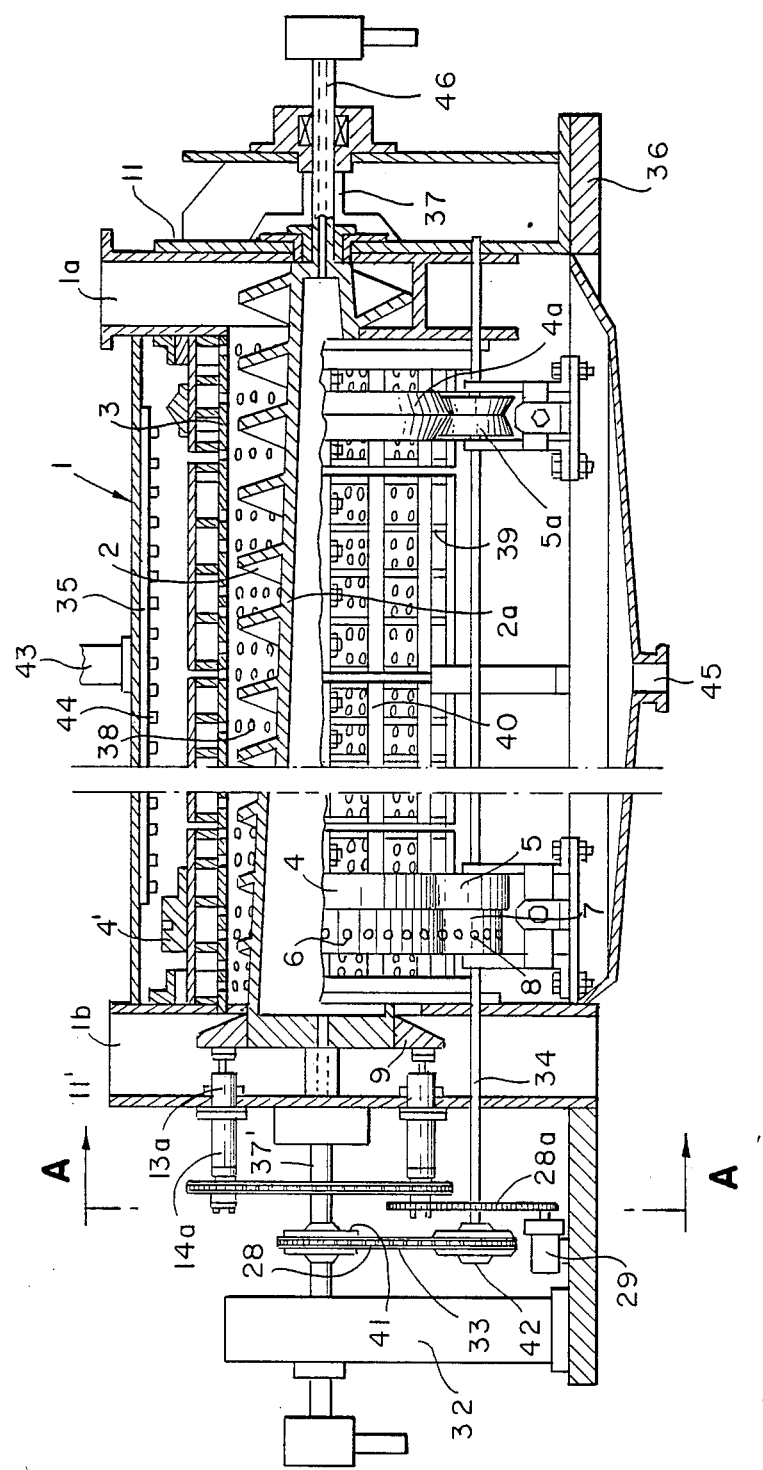
FIG. 1 is a side view of the filtration apparatus of the present invention containing cutaway portions in order to illustrate the construction of the apparatus of the present invention.

Referring now in detail to the drawings for the purpose of illustrating preferred embodiments of the present invention, the filtration apparatus having a control valve means as shown in FIG. 1 comprises a tapered rotary cylinder 2a having a plurality of conveying screws 2, an inlet 1a, an outlet 1b, a rotary filtration cylinder 3 disposed around the tapered rotary cylinder 2a, a housing means 1 enclosing the rotary filtration cylinder 3 and a fixed injection pipe 35 disposed above the rotary filtration cylinder 3.

The tapered rotary cylinder 2a is attached to a support foundation 36 by a front and a rear tubular rotating shafts 37 and 37' whereby the tapered rotary cylinder 2a can rotate. The support foundation 36 is provided with a front and a rear support members 11 and 11' disposed at a front and a rear portions thereof. The conveying screws 2 gradually reduce in size from the inlet end 1a to the outlet end 1b.

The rotary filtration cylinder 3 is positioned in close proximity to the circumference of the conveying screws 2 for conveying and grinding the waste product. Also, the rotary filtration cylinder 3 includes a plurality of apertures 38 therein for filtering the waste product. The rotary filtration cylinder 3 is provided with a plurality of rigid circumference members 39 disposed therein and a plurality of rigid horizontal members 40 disposed between the front end and the rear end thereof for protecting the rotary filtration cylinder 3. The rotary filtration cylinder 3 is provided with a first flat guiding track 4 disposed around the rear portion and a V-shaped guiding track 4a disposed around the front portion thereof for contacting a pair of first flat driving rollers 5 and to a pair of V-shaped driving rollers 5a, respectively. The first flat guiding tracks 4 are provided with a second flat guiding track 4' extended therefrom. The second guiding track 4' contains a plurality of apertures 6 for receiving a plurality of pins 8 disposed on a pair of second flat driving rollers 7 extended from the pair of first flat driving rollers 5. Therefore, the rotary filtration cylinder 3 is slowly rotated by rotating the pair of first and second driving rollers 5 and 7 which have a shaft 34. The shaft 34 connects to a second chain gear 42 which connects to a first chain gear 41 through a main chain 33. The first chain gear 41 connects the rear tubular rotating shaft 37'.

A speed reducing means 32 is connected to the rear tubular rotating shaft 37' and fixed on the support foundation 36. The control valve means includes a control valve 9 disposed in the outlet 1b, a plurality of spring tubular members 13a, a plurality of piston tubular members 14a which are connected to a first and a second chains 28 and 28a, and a bidirectional rotating motor 29. The fixed steam injection pipe 35 is provided with a plurality of nozzles 44 for heating the waste product and cleaning away the dregs which collect in the apertures 38 of the rotary filtration cylinder 3 during the filtration operation. The nozzles 44 spray hot steam introduced through the steam injection pipe 35 which connects to a steam supply line 43. The housing means 1 contains a drain pipe 45 for draining the liquid separated from the solid waste product.

Figure 2:
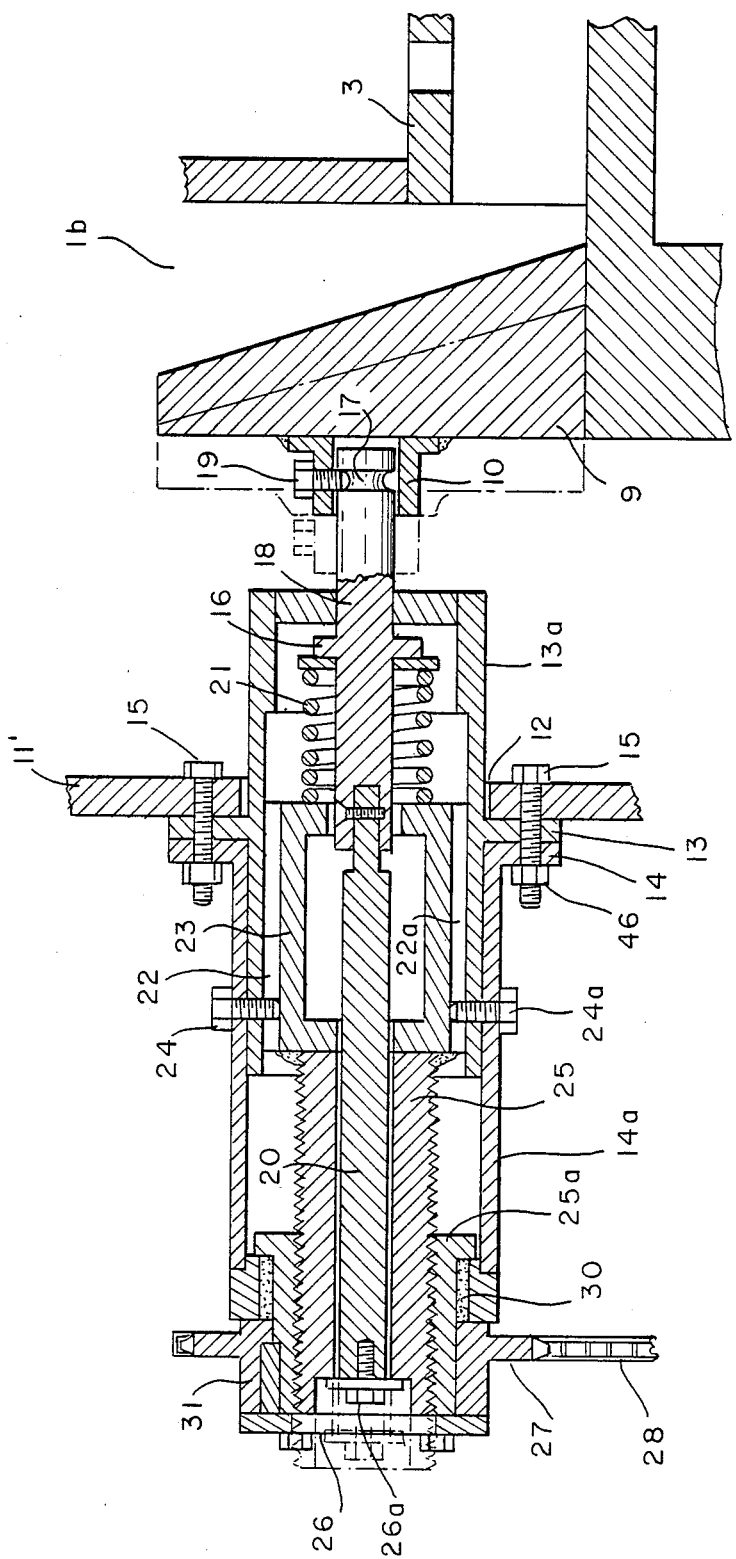
FIG. 2 is a sectional view of a control valve means associated with a treatment zone between a tapered rotary cylinder and a rotary filtration cylinder of the present invention.
Figure 3:
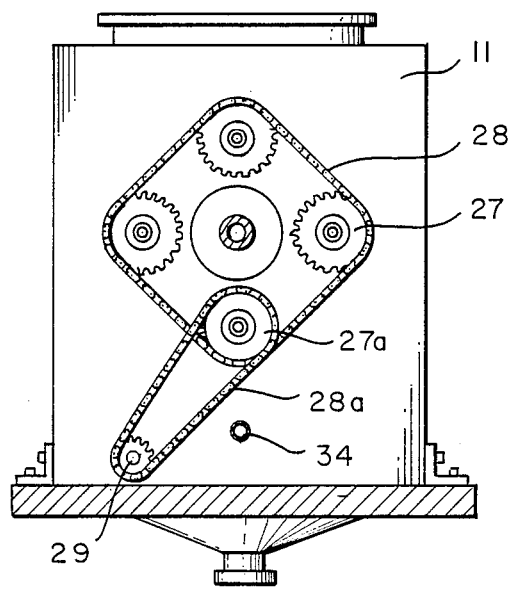
FIG. 3 is a cross-sectional view of FIG. 1, taken along line A—A.

As shown in FIGS. 2 and 3, the tubular spring and the tubular piston members 13a and 14a are connected to the rear support member 11' by bolts 15 and nuts 46 through flanges 13 and 14. The piston tubular member 13a is connected to a sprocket 27 through a male 25a attached to the sprocket 27, and a bush 30 and a wedge 31. Also, the tubular piston member 13a contains a female screw piston 23 which slidably connects to a hollow 25 for operatively mating with the male screw 25a of the sprocket 27. Bolts 24 connected to the tubular spring and piston members 13a and 14a are fixed the hollow piston 23 for preventing the hollow piston 23 from rotating. A movable bar 20 disposed within the hollow piston 23 and male screw 25 connects to a push bar 18 which connects to the control valve 9 by a bolt 19. A coil spring 21 is wound around the push bar 18. The push bar 18 includes a raised portion 16 disposed within the flange piston tubular member 13a for fixing one end of the coil spring 21 and for preventing the push bar 18 from moving over to the control valve 9. Since the movable bar 20 connects to the push bar 18 at the one end and connects to the male screw 25 at the other end thereof, when the sprocket 27 moves backward, the control valve 9 moves backward to open the opening of the outlet 1b.

As shown in FIG. 3, the plurality of sprockets 27 are rotated by the bidirectional rotating motor 29 through a sprocket belt 28. The control valve 9 is moved forward or backward by rotating the bidirectional rotating motor 29 in the clockwise or counterclockwise directions. It is very easy to control the pressure in the treatment zone between the tapered rotary cylinder 2a and rotary filtration cylinder 3 since, when the bidirectional rotating motor 29, is changeably rotated in different directions by operation of a switch (not seen), the control valve is easily opening and closing to open and close the opening of the outlet 16.

According to the present invention, the apparatus operates as follows: when the tubular rotating shafts 37' attached to the speed reducing means 32 and supported by the support members 11 and 11 which stand on the support foundation 36 is rotated by a motor (not shown), the tapered rotary cylinder 2a rotates at a high speed. The rotary filtration cylinder 3 also rotates at a low speed by engaging the main chain 33 of the first and second gears 41 and 42, and driving rollers 5 and 5a in the guiding tracks 4 and 4a disposed around the front and rear portions of the rotary filtration cylinder 3. The waste product is supplied through the inlet 1a and is formed on the front side of the housing means 1, and is filtered and dehydrated during its movement through the plurality of conveying screws 2. Hot steam supplied through the steam supplying means 43 sprays the surface of the rotary filtration cylinder 3 through nozzles 44 disposed at the steam injection pipe 35. Also, the hot steam supplied through a steam inlet pipe 46 simultaneously sprays and heats the interior of the tapered rotary cylinder 2a. In such cases, the protein in the waste product is dehydrated and dissolved leaving the waste products mixed with water and dregs which are cleaned away from the apertures 38.

The liquid which is filtered through the plurality of apertures 38 of the rotary filtration cylinder 3 is thereby separated from the solid waste products. Thus, the liquid is drained through the drain pipe 45 and the solid waste material is discharged through the outlet 1b.

According to present invention, since the hot steam sprays the surface of the slowly rotating rotary filtration cylinder 3 thereby heating and washing the rotary filtration cylinder 3 and additional hot steam is supplied to the interior of the very fast rotating tapered rotary cylinder 2a further heating the treatment zone between the rotary filtration cylinder 3 and the tapered rotary cylinder 2a, the efficiency of the overall filtration and washing process is substantially improved and the tapered cylinder 2a is not cracked or transformed.

When the sprockets 27 are rotated in the clockwise direction by the bidirectional rotating motor 29 through the belt 28, the control valve 9 moved forward for closing the opening of the outlet 1b which is disposed in the rear end of the treatment zone between the tapered rotary cylinder 2a and the rotary filtration cylinder 3. On the contrary, when the sprockets 27 are rotated in the counter clockwise direction, the control valve 9 moves backward for opening the opening of the outlet 1b. Therefore, the control valve 9 can easily control the pressure in the treatment zone by operation of the bidirectional rotating motor 29.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A filtration apparatus for the treatment of liquid containing waste product which comprises:
   a housing means,
   a rotary filtration cylinder disposed in said housing means and having a surface which contains means defining a plurality of apertures for receiving waste product to be treated and filtered,
   tapered rotary cylinder rotatably disposed within said rotary filtration cylinder for rotating and conveying said waste product, wherein said rotary filtration cylinder and said tapered rotary cylinder define a treatment zone therebetween, waste product inlet means operatively associated with said housing means and said rotary filtration cylinder for introducing waste product to be treated into said treatment zone, waste product outlet means operatively associated with said housing means and said rotary filtration cylinder for removing waste material that has been treated from said treatment zone, steam supplying means operatively associated with said housing means, steam injection means fluidly communicating with said steam supplying means and said tapered rotary cylinder for introducing hot steam from said steam supplying means into the interior of said tapered rotary cylinder, wherein said tapered rotary cylinder is heated thereby heating said treatment zone and said waste material therein, a fixed steam cleaning pipe disposed in said housing means, in the vicinity of the outside of said rotary cylinder, and fluidly communicating with said steam supplying means, said fixed steam cleaning pipe having a plurality of nozzles for spraying and washing clean said rotary filtration cylinder through said nozzles with steam from said steam supplying means, a plurality of control valve members disposed within said outlet, one of said plurality of control valve members including:

a control valve for opening and closing an opening of said outlet, a connecting bar connected to said control valve at one end thereof and wound with a coil spring, a hollow piston connected to said coil spring, a hollow male screw connected to said hollow piston, a movable bar connected to the other end of said connecting bar at one end thereof and connected to said hollow male screw at the other end thereof, a female screw operatively mating with said male screw, a sprocket attached to said female screw, and a bidirectional rotating motor connecting to said sprocket through a chain, and adapted for rotation in clockwise and counterclockwise directions by operation of a switch, and adapted to cause the female screw moves backward and forward through the chain and the sprocket, to the movable bar to move backward and forward through the male screw and therafter the control valve to move backward and forward through the connecting bar, the control valve easily controlling the pressure in the treatment zone.

2. The filtration apparatus of claim 1, wherein said rotary filtration cylinder includes a plurality of rigid circumference members and a plurality of rigid horizontal members disposed therearound.

3. The filtration apparatus of claim 1, wherein said tapered rotary cylinder includes a plurality of conveying disposed thereon.

4. The filtration apparatus of claim 1, wherein said rotary filtration cylinder includes a front guiding track and a rear guiding track disposed around said rotary filtration cylinder supported by driving rollers.

5. The filtration apparatus of claim 4, wherein a cylinder chain gear is disposed between said rear guiding track and the rear end of said rotary filtration cylinder, said cylinder chain gear engaging a power driven chain so as to slowly rotate said rotary filtration cylinder in said housing means.

6. The filtration apparatus of claim 4, wherein said rear guiding track has a V-shaped configuration and said driving rollers which contact said rear guiding track so as to engage said rear guiding track.

7. The filtration apparatus of claim 4, wherein said front guiding track has a flat configuration and said driving rollers which contact said front guiding track are flat so as to engage said front guiding track.

8. The filtration apparatus of claim 1, wherein the hollow piston is retained by a plurality of bolts for preventing it from rotating.

9. The filtration apparatus of claim 1, wherein the piston and the connecting and movable bars are disposed in tubular spring and piston members, respectively.

10. The filtration apparatus of claim 9, wherein the spring and piston tubular members have a flange, respectively, for mounting to a rear support by bolts.

* * * * *